(12) United States Patent
Hayes

(10) Patent No.: US 6,880,844 B2
(45) Date of Patent: Apr. 19, 2005

(54) WIND-ASSISTED BICYCLE

(76) Inventor: James C. Hayes, 8150 Odile, Brossard, Quebec (CA), J4Y 2W8

( * ) Notice: Subject to any disclaimer, the term of this patent is extended or adjusted under 35 U.S.C. 154(b) by 0 days.

(21) Appl. No.: 10/309,899

(22) Filed: Dec. 5, 2002

(65) Prior Publication Data

US 2004/0108679 A1 Jun. 10, 2004

(51) Int. Cl.⁷ ................................................ B62M 1/10
(52) U.S. Cl. ........................................................ 280/213
(58) Field of Search ................................ 280/212, 213, 280/214; 74/DIG. 9; 440/8; 296/180.1

(56) References Cited

U.S. PATENT DOCUMENTS

| 4,437,698 A | * | 3/1984 | Tantalo ...................... 296/180.3 |
| 5,909,859 A | * | 6/1999 | Janicki ..................... 244/153 A |
| 6,700,215 B1 | * | 3/2004 | Wu ............................... 290/44 |

FOREIGN PATENT DOCUMENTS

| CN | 2058162 | | 6/1990 | | |
| CN | 2179322 | | 10/1994 | | |
| CN | 2198189 | | 5/1995 | | |
| CN | 1119163 A | * | 3/1996 | ............ | B62M/1/00 |
| CN | 2272410 | | 1/1998 | | |
| DE | 3201555 A1 | * | 2/1984 | ............. | F03D/5/04 |
| DE | 4202951 A1 | * | 8/1993 | ............ | B60K/6/00 |
| JP | 2003-254223 A | * | 9/2003 | ............. | F03D/9/00 |
| WO | WO 95/20518 | * | 8/1995 | .......... | B62M/23/02 |

OTHER PUBLICATIONS

Abstract of EP–0 248 136 of 1987.
Abstract of FR–2 709 723 of 1995.
Abstract of US–4 019 828 of 1977.

* cited by examiner

Primary Examiner—Lesley D. Morris
Assistant Examiner—Daniel Yeagley
(74) Attorney, Agent, or Firm—Robic

(57) ABSTRACT

The bicycle has a frame on which a front wheel and a rear wheel are rotatably mounted. At least one of these two wheels is connected to at least one device using wind-generated Bernouilli force to assist forward motion of the bicycle. Such device has a wind-driven turbine with a plurality of horizontal air foils attached to a shaft rotatably mounted about a horizontal axis. It also has a shield positioned adjacent to part of the turbine to deflect wind and prevent it from impacting the air foils when they rotate forwardly. A clutch is operatively connected to the shaft of the turbine to the wheel for transferring the force generated by the wind within the turbine to this wheel.

10 Claims, 3 Drawing Sheets

US 6,880,844 B2

WIND-ASSISTED BICYCLE

FIELD OF THE INVENTION

The present invention is directed to a bicycle of improved structure.

More specifically, the invention is directed to a bicycle having at least one of its wheels, preferably the front one, which is connected to at least one device using wind-generated Bernouilli force to assist forward motion of said bicycle.

BRIEF DESCRIPTION OF THE PRIOR ART

The basic concept of using wind to assist the operation and driving of a bicycle or any other kind of vehicle such as a car, is a concept that is already known per se. In support of this contention, reference can be made to the following prior art references:

U.S. Pat. No. 4,109,828 of 1977
EP 0,248,136 of 1987
FR 2,709,723 of 1995
CN 2,056,691 of 1990
CN 2,058,162 of 1990
CN 2,085,316 of 1991
CN 2,179,322 of 1994
CN 2,198,189 of 1995
CN 2,272,410 of 1998

Amongst these references, CN 2,058,162 of 1990 is of particular interest inasmuch as it discloses a "wind-driven speed increaser for bicycle", comprising a windmill-like element comprising a plurality of air foils attached to a horizontal shaft connected to the front wheel of a bicycle via a clutch. Two shields are provided on the front and rear portions of the windmill, one on top of it, the other one at the bottom of it, in order to deflect wind and prevent it from impacting the air foils when they rotate forwardly.

SUMMARY OF THE INVENTION

The object of the present invention is to provide a bicycle comprising a frame on which a front wheel and a rear wheel are rotatably mounted, which bicycle is improved in that at least one of its wheels, preferably the front one, is connected to at least one and preferably two opposite devices using wind-generated Bernoulli force to assist forward motion of the bicycle.

In accordance with the invention, each devise used to assist forward motion of the bicycle comprises:

a wind-driven turbine comprising a plurality of horizontal air foils attached to a shaft rotatably mounted about a horizontal axis;

a shield positioned adjacent to part of the turbine to deflect wind and prevent it from impacting the air foils when they rotate forwardly; and a clutch operatively connecting the shaft of the turbine to the at least one wheel of the bicycle for transferring the force generated by the wind within the turbine to said at least one wheel.

Preferably, a shield is provided with an internal channel extending from a front opening through which wind may enter, to a rear outlet through which the wind diverted through the internal channel may be injected rearwardly behind the air foils while they rotate forwardly.

The invention and its operation will be better understood upon reading the following non-restrictive description of a preferred embodiment thereof, made with reference to the accompanying drawings.

DESCRIPTION OF A PREFERRED EMBODIMENT OF THE INVENTION

Figure 1:
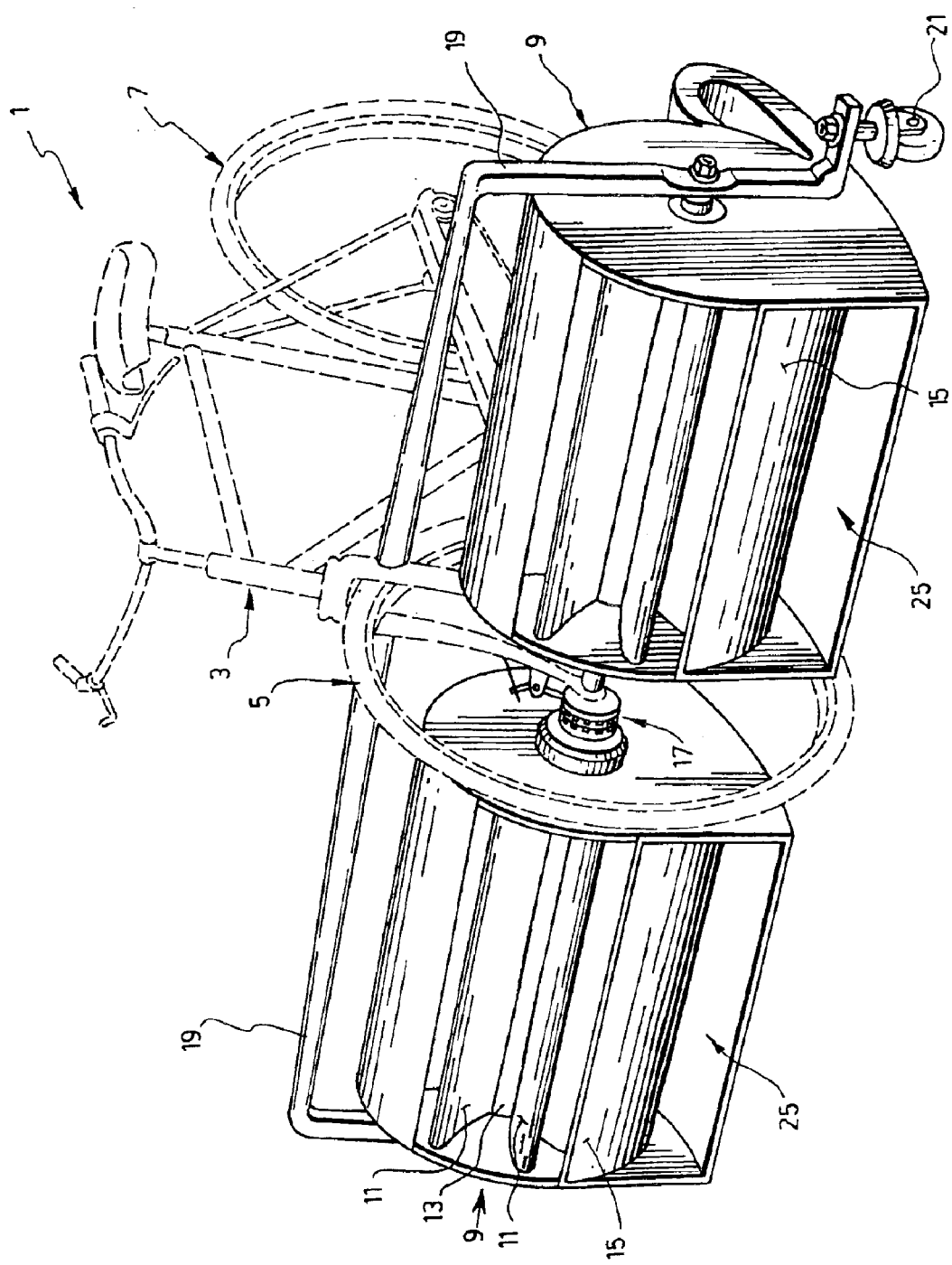
FIG. 1 is a front portion view of an improved bicycle according to a preferred embodiment of the invention.

The bicycle 1 according to the preferred embodiment of the invention as shown in the accompanying drawings comprises, like every bicycle, a frame 3 on which a front wheel 5 and a rear wheel 7 are rotatably mounted. On each side of the front wheel 5, a device 9 is connected, which uses wind-generated Bernoulli force to assist forward motion of the bicycle.

From a practical standpoint, only one device 9 could be connected on one side only of the wheel. Such would work but would unnecessary unbalance the bicycle. Accordingly, it is not compulsory but highly preferable that the bicycle 1 comprises two devices symmetrically positioned with respect to its frame 3.

Of course, the device(s) 9 could also be connected to the rear wheel 7 of the bicycle instead of the front one, if desired. However, such would make the driving mechanism of the bicycle more complicated, since the rear wheel is already connected via a chain to the crank gear of the bicycle.

Figure 2:
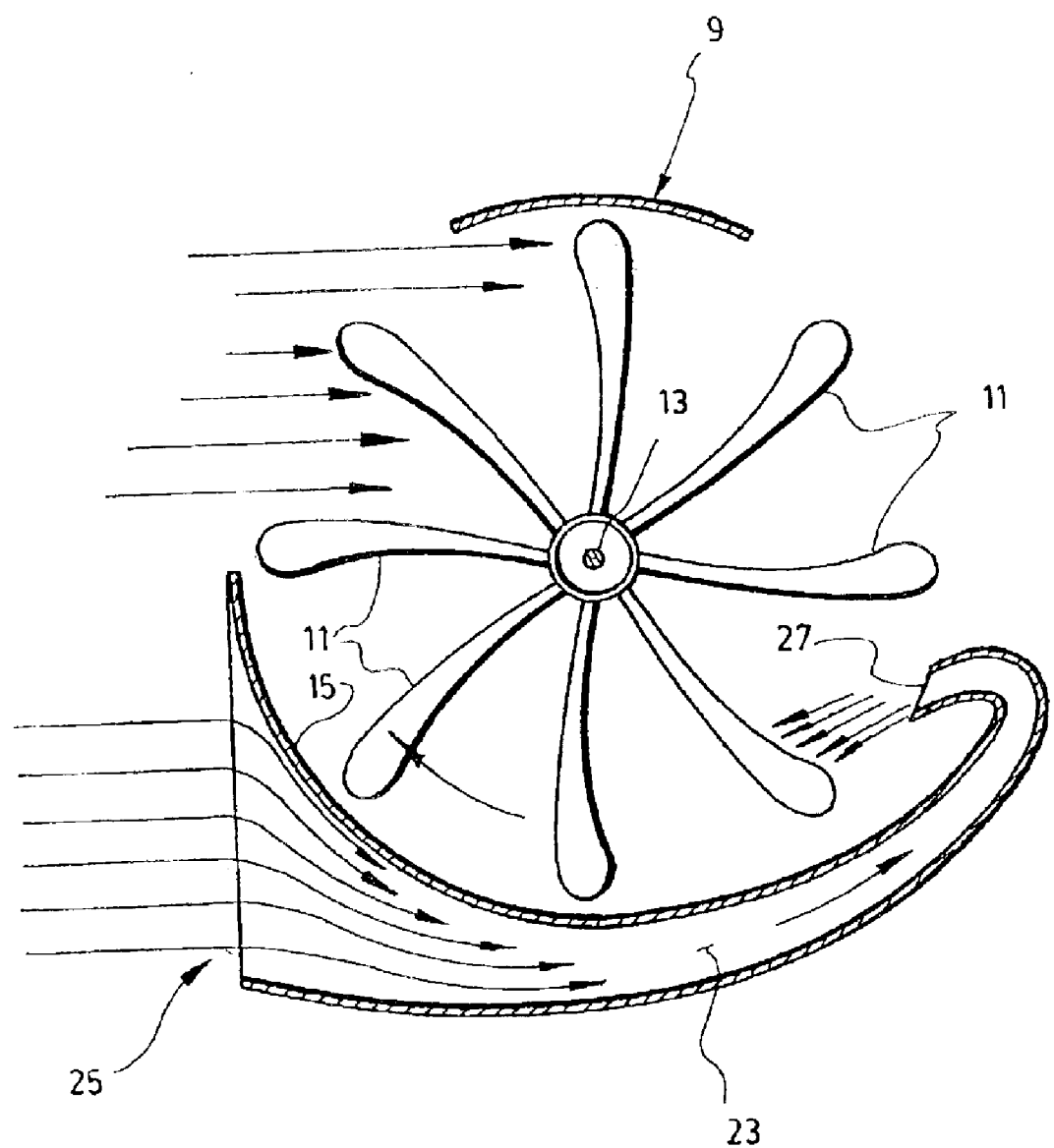
FIG. 2 is a side elevational, cross-sectional view of one of the turbines connected to the front wheel of the bicycle shown in FIG. 1.
Figure 3:
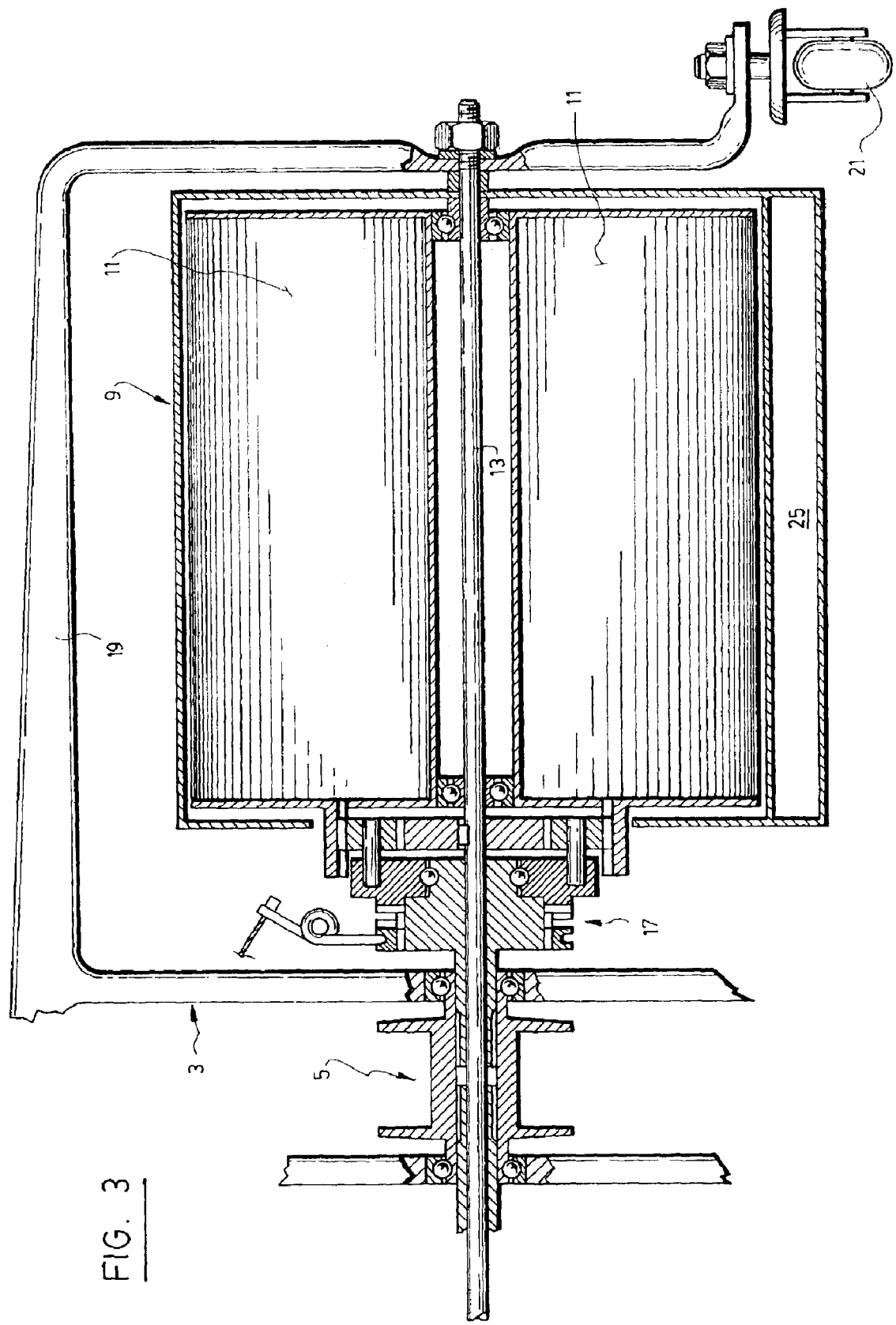
FIG. 3 is a front elevational cross-sectional view of the turbine connected to the left-hand side portion of the front wheel of the bicycle shown in FIG. 1.

As better shown in FIGS. 2 and 3, each device 9 basically comprises:

a wind-driven turbine comprising a plurality of horizontal air foils 11 attached to a shaft 13 rotatably mounted about a horizontal axis;

a shield 15 positioned adjacent to part of the turbine to deflect wind and prevent it from imparting the air foils 11 when they rotate forwardly; and an adjustable clutch 17 of conventional structure operatively connecting the shaft 13 of the turbine to the front wheel 5 for transferring the force generated by the wind within the turbine to said front wheel 5.

Each device 9 may comprise also a rigid support 19 connected to the frame 3 of the bicycle. Preferably, each rigid support 19 may also include a ground-contacting roller 21 positioned at a distance away from the front wheel 5, for stabilization purpose.

Preferably, the shield 15 of the turbine of each device 9 is positioned close to the ground, thereby giving access to the wind within the turbine on top of it that is at a given distance above the ground. Such minimizes the effect of ground friction onto the wind.

If desired, the shield 15 of each of device may be pivotably mounted about the horizontal axis of the turbine so as to be reversed from the front to the back of this turbine when strong wind comes from behind the bicycle.

Advantageously, the shield 15 may also be provided with an internal channel 23 extending from a front opening 25 through which wind may enter to a rear outlet 27 through which the wind diverted through the internal channel 23 may be injected rearwardly behind the air foils 11 while they rotate forwardly. Such improves the efficiency of the corresponding device 9.

The bicycle according to the invention is particularly efficient. As aforesaid, thanks to the device(s) 9, it uses wind generated Bernoulli force to assist forward motion (or rearward motion when the shield(s) 15 are folded back) of it.

Of course, numerous modifications could be made to the bicycle according to the preferred embodiment of the invention as disclosed hereinabove, without departing from the scope of the invention.

What is claimed is:

1. In a bicycle comprising a frame on which a front wheel and a rear wheel are rotatably mounted, the improvement wherein at least one of said wheels is connected to at least one device using wind-generated Bernoulli force to assist forward motion of said bicycle, said at least one device comprising:

a wind-driven turbine comprising a plurality of horizontal air foils attached to a shaft rotatably mounted about a horizontal axis;

a shield positioned adjacent to part of the turbine to deflect wind and prevent said wind from impacting the air foils when they rotate forwardly; and a clutch operatively connecting the shaft of the turbine to said at least one wheel for transferring the force generated by the wind within said turbine to said at least one wheel, wherein the shield is provided with an internal channel extending from a front opening through which wind may enter to a rear outlet through which the wind diverted through the internal channel may be injected rearwardly behind the air foils while said air foils rotate forwardly.

2. The improved bicycle of claim 1, comprising two of said at least one device respectively mounted on both sides of said at least one wheel.

3. The improved bicycle of claim 2, wherein said at least one wheel is the front wheel of the bicycle.

4. The improved bicycle of claim 3, wherein each of said two devices comprises a rigid support connected to the frame of the bicycle.

5. The improved bicycle of claim 4, wherein said rigid support including a ground-contacting roller positioned at a distance away from the front wheel, for stabilization purpose.

6. The improved bicycle of claim 5, wherein the turbine of each of said two devices extends at a given distance above the ground to minimize the effect of ground friction onto the wind.

7. The improved bicycle of claim 6, wherein the shield of each of said two devices is pivotably mounted about the horizontal axis of the turbine so as to be reversed from the front to the back of said turbine when the wind comes from behind the bicycle.

8. In a bicycle comprising a frame on which a front wheel and a rear wheel are rotatably mounted, the improvement wherein at least one of said wheels is connected to at least one device using wind-generated Bernouilli force to assist forward motion of said bicycle, said at least one device comprising:

a wind-driven turbine comprising a plurality of horizontal air foils attached to a shaft rotatably mounted about a horizontal axis;

a shield positioned adjacent to part of the turbine to deflect wind and prevent said wind from impacting the air foils when they rotate forwardly; and a clutch operatively connecting the shaft of the turbine to said at least one wheel for transferring the force generated by the wind within said turbine to said at least one wheel, wherein said bicycle comprises two of said at least one device respectively mounted on both sides of said at least one wheel; and each of said two devices comprises a rigid support connected to the frame of the bicycle.

9. The improved device of claim 8, wherein:

the rigid support includes a ground-contacting roller positioned at a distance away from said at least one wheel, for stabilization purpose;

the turbine of each of said two devices extends at a given distance above the ground to minimize the effect of ground friction onto the wind.

10. In a bicycle comprising a frame on which a front wheel and a rear wheel are rotatably mounted, the improvement wherein at least one of said wheels is connected to at least one device using wind-generated Bernouilli force to assist forward motion of said bicycle, said at least one device comprising:

a wind-driven turbine comprising a plurality of horizontal air foils attached to a shaft rotatably mounted about a horizontal axis;

a shield positioned adjacent to part of the turbine to deflect wind and prevent said wind from impacting the air foils when they rotate forwardly; and a clutch operatively connecting the shaft of the turbine to said at least one wheel for transferring the force generated by the wind within said turbine to said at least one wheel, wherein the shield of said at least one device is pivotably mounted about the horizontal axis of the turbine so as to be reversed from the front to the back of said turbine when the wind comes from behind the bicycle.

\* \* \* \* \*